(12) United States Patent
Smith et al.

(10) Patent No.: US 12,163,874 B2
(45) Date of Patent: *Dec. 10, 2024

(54) VARIABLE SOIL SAMPLING DEVICE

(71) Applicant: SKC, Inc., Eighty Four, PA (US)

(72) Inventors: Donald Lee Smith, Finleyville, PA (US); Linda Coyne, Pittsburgh, PA (US); Shane Michael Essay, Jr., Vanderbilt, PA (US)

(73) Assignee: SKC, Inc., Eighty Four, PA (US)

( * ) Notice: Subject to any disclaimer, the term of this patent is extended or adjusted under 35 U.S.C. 154(b) by 488 days.

This patent is subject to a terminal disclaimer.

(21) Appl. No.: 17/366,174

(22) Filed: Jul. 2, 2021

(65) Prior Publication Data

US 2021/0333174 A1    Oct. 28, 2021

Related U.S. Application Data

(63) Continuation-in-part of application No. 15/923,751, filed on Mar. 16, 2018, now Pat. No. 11,079,306.

(60) Provisional application No. 62/472,774, filed on Mar. 17, 2017.

(51) Int. Cl.
    *G01N 1/22* (2006.01)

(52) U.S. Cl.
    CPC ......... *G01N 1/2214* (2013.01); *G01N 1/2294* (2013.01)

(58) Field of Classification Search
    CPC ...... G01N 1/22; G01N 1/2214; G01N 1/2294; G01N 33/24; E02D 1/00; E02D 1/04; E21B 49/00
    See application file for complete search history.

(56) References Cited

U.S. PATENT DOCUMENTS

| 2,345,219 A | 3/1944 | Sanderson |
| 5,594,185 A | 1/1997 | Winberry et al. |
| 5,641,642 A | 6/1997 | Peyton et al. |

FOREIGN PATENT DOCUMENTS

KR    101571779 B1 * 11/2015    ............... G01N 1/04

* cited by examiner

*Primary Examiner* — Benjamin R Schmitt
(74) *Attorney, Agent, or Firm* — The Webb Law Firm

(57) ABSTRACT

Disclosed herein is a variable soil sampling device which may be customized with respect to sampling rate and sorbent material used. Multiple variable sampling devices may be attached to each other to simultaneously sample different components or contaminants in the same time period.

20 Claims, 12 Drawing Sheets

VARIABLE SOIL SAMPLING DEVICE

CROSS-REFERENCE TO RELATED APPLICATIONS

This application is a Continuation-In-Part of U.S. application Ser. No. 15/923,751 filed Mar. 16, 2018 which claims the benefit of U.S. provisional patent application No. 62/472,774 filed Mar. 17, 2017, the contents of which are hereby incorporated by reference in their entirety.

BACKGROUND OF THE INVENTION

Field of the Invention

The present invention relates generally to devices use to sample soil.

Description of Related Art

Soil testing is an important diagnostic tool for environmental assessments. Soil testing can also be used to identify application rates of waste materials containing nutrients or other elements that could harm the environment. Soil testing is required in many regulations and management guidelines to assess environmentally harmful levels of certain compounds. In particular, soil gas sampling is a valuable screening method to determine the presence, composition, and origin of underground contaminants such as volatile organic compounds (VOCs). Soil gas surveys are often used to locate nonaqueous phase liquids (NAPLs), which are organic liquids or wastes that are sufficiently immiscible in water such that they may persist as a separate phase in the subsurface for many years.

Soil gas sampling may be accomplished in a variety of ways, including active and passive. Examples of active sampling methods include using a gas probe connected to a pumping system to pull the gas out of the soil and removal of the gas for later laboratory analysis. Passive sampling may be accomplished by exposing a sorbent material to the soil environment to be sampled and allowing gas samples to be collected over time. That sorbent material may then be analyzed for its content. The success of such techniques depends greatly on the ability to collect samples in such a passive way. Sampling conditions must be optimized for maximum sampling collection. For example, the depth of the sampling probe, the chemical efficiency of the sorbent material to collect the target component, and the permeability of the housing in which it is enclosed all play an important role in determining accuracy of soil gas measurements. Further, often multiple different target components are identified for testing in a single soil site or environment. Each component will have a set of ideal sampling conditions which may be difficult to achieve quickly and with a single sampling probe.

The present invention provides a versatile yet simple sampling system that may be easily customized to analyze a number of different target components in the same collection period.

SUMMARY OF THE INVENTION

The present invention provides a variable sampling device having a sampling body, a removably connected barrier door that may be removed to reveal a space or opening where sorbent material may be placed. The sampling body further has a mechanism for interlocking with another variable sampling device, such that one or more variable sampling devices may be attached. Further, the barrier door has holes which may be varied in size and number to provide a desired permeability to the variable sampling device. By using different sorbents in each variable sampling device as well as varying the permeability of the barrier door, a wide variety of target components may be sampled.

The present invention also provides a method for using said variable sampling device, which includes inserting a sorbent into one or more variable sampling devices, attaching one or more variable sampling devices together, and exposing the one or more variable sampling devices to the sampling environment. In some embodiments, variable sampling devices are connected end-to-end and aligned along a center axis and are placed down a hole or a pipe. This may be accomplished by attaching a rope, chain, or other similar material to the top of the uppermost variable sampling device. Optionally, other elements may be attached, such as a weight, to the bottom of a variable sampling device. Each component may be attached via the same interlocking mechanism used to attach one variable sampling device to another.

The present invention further provides a variable sampling device having a sampling body with an outer perimeter having one or more holes and an opening defining a space where a sorbent material may be placed. The sampling body further has a mechanism for interlocking with another variable sampling device, such that one or more variable sampling devices may be attached. The outer perimeter of the sampling body has holes which may be varied in size and number to provide a desired permeability to the variable sampling device. By using different sorbents in each variable sampling device as well as varying the permeability of the holes, a wide variety of target components may be sampled.

BRIEF DESCRIPTION OF THE SEVERAL VIEWS OF THE DRAWINGS

Further aspects of the present disclosure together with additional features contributing thereto and advantages accruing there from will be apparent from the following description of embodiments of the disclosure which are shown in the accompanying drawing figures wherein.

DETAILED DESCRIPTION OF THE INVENTION

The invention will be described with respect to FIGS. 1 through 12. It should be understood, however, that these figures are an example of a particular embodiment and that there exist many more embodiments that encompass the characteristics disclosed and described herein. While the following description discloses exemplary embodiments, the scope of the present patent application is not limited to the disclosed embodiments, but also encompasses combinations of the disclosed embodiments, as well as modifications to the disclosed embodiments as well as other embodiments.

It is often desirable to measure different components of an environmental sample, for example, the air, soil, or water, to detect contamination or other materials that may be present. The present invention provides a variable sampling device for environmental sampling.

Figure 1:
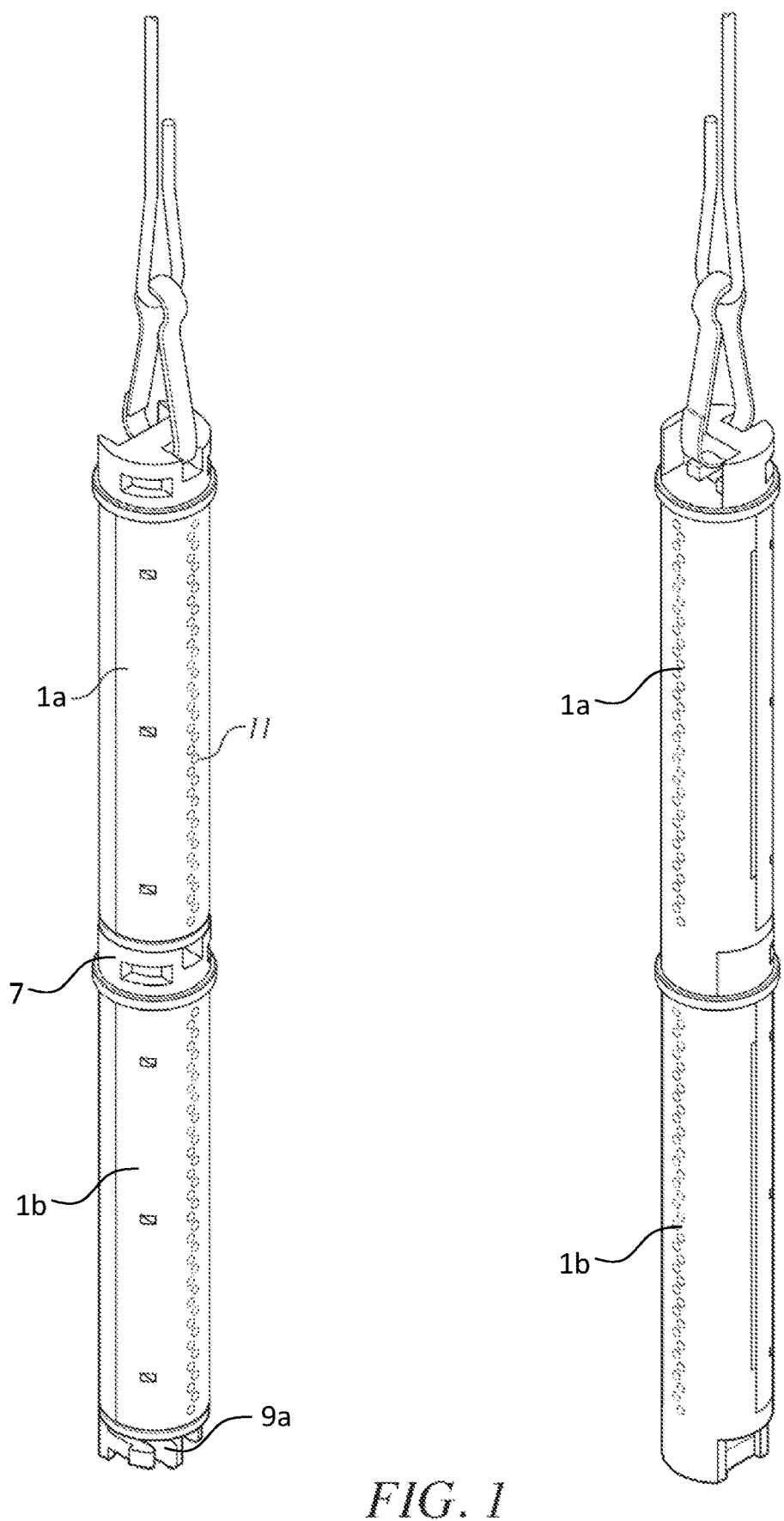
FIG. 1 shows a front and a back view of one embodiment of the variable sampling device.

FIG. 1 shows one embodiment of a variable sampling device as contemplated by the present invention. As depicted, FIG. 1 shows two variable sampling devices 1a and 1b, connected to one another by a connecting mechanism 7. The bottom variable sampling device 1b has a connector 9a to optionally connect to a third variable sampling device (not pictured). Notably, each variable sampling device exhibits holes 11 through which air or other gasses may flow.

Figure 2:
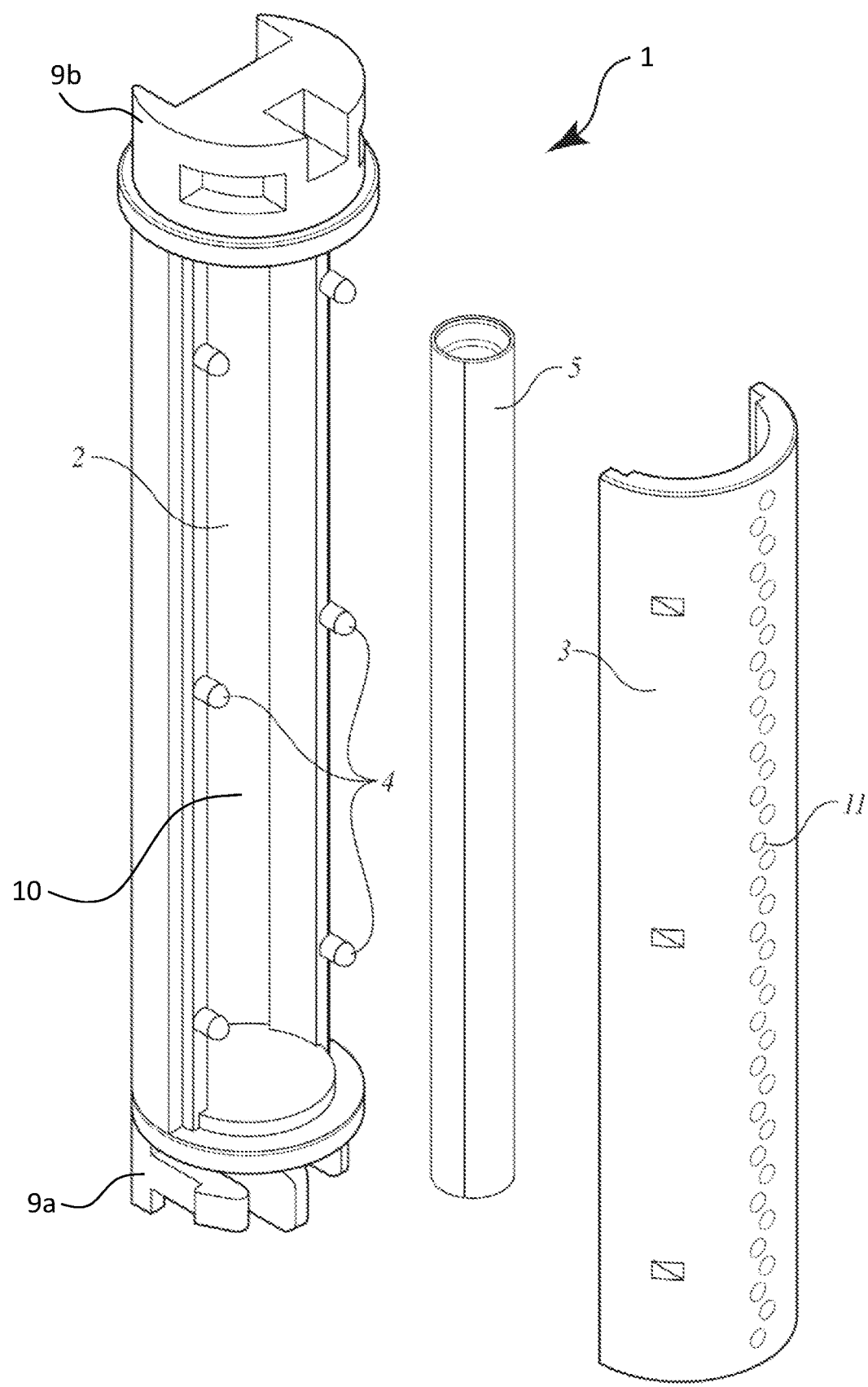
FIG. 2 shows one embodiment of a dissembled variable sampling device consisting of a sampling body, barrier door, and an example of a sorbent material that may be placed within the sampling body.
Figure 3:
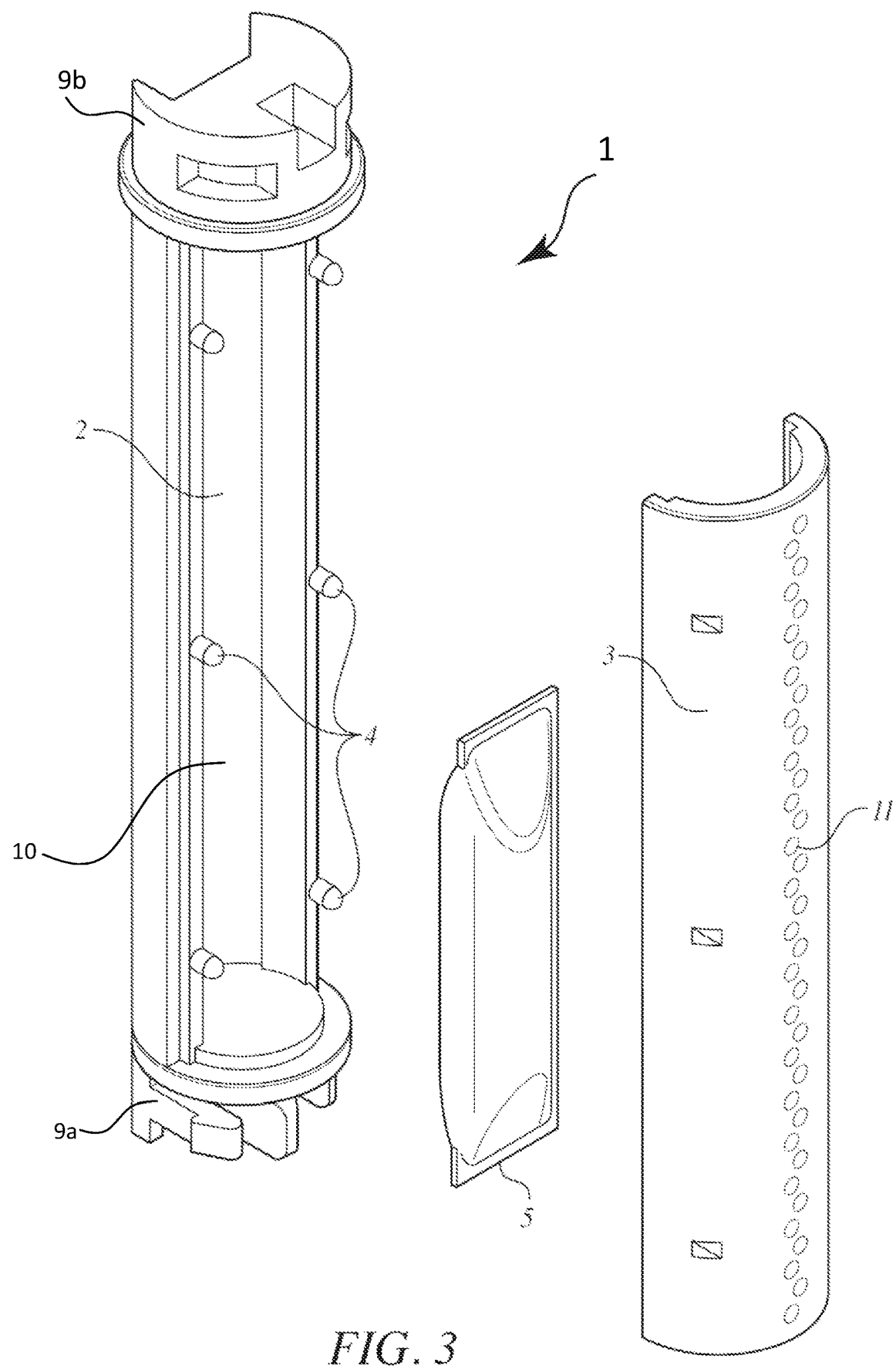
FIG. 3 shows another embodiment of a disassembled variable sampling device consisting of a sampling body, barrier door, and an example of a sorbent material that may be placed within the sampling body.

FIG. 2 and FIG. 3 each display an embodiment of a variable sampling device. Each variable sampling device 1 consists of a sampling body 2, a barrier door 3, and a space 10. In contemplated embodiments, the barrier door is removably connected to the sampling body. In FIG. 2 and FIG. 3, the barrier door 3 is may be fully removed to reveal the space 10 such that a sorbent 5 may be placed inside. In FIGS. 2 and 3, the barrier door 3 may be reattached to the sampling body 2 by pins 4 on the sampling body 2 that connect with voids in the barrier door 3. In other embodiments, not shown, pins may be on the barrier door and connect with voids in the sampling body. In yet other embodiments, the barrier door may be removably connectable the sampling body by other means, for example, pins of a different shape or arrangement, a hinge mechanism, or any method that may be contemplated by one of skill in the art the achieve a barrier door that may be removably connected to the sampling body. The sampling body in each of FIGS. 2 and 3 additionally has two connecting mechanisms 9a and 9b that enable attaching the depicted variable sampling device 1 to another variable sampling device (not shown).

While in use, a sorbent material 5 will be placed inside the variable sampling device and the holes 11 on the barrier door 3 will permit air flow and collection of particulate or chemicals in the air by the sorbent 5 inside. The number of holes, the pattern of holes, as well as the size of the holes may be altered to achieve a desired permeability or sampling rate. Typical permeability of the barrier could be from 0.5 to 130 milliliters per minute. Other rates are also possible. After a specified period of time, the sorbent can then be removed for analysis, and the sampling body refilled with fresh sorbent for another use.

FIGS. 1, 2, and 3 show each variable sampling device having a cylindrical shape, however the shape is not limited to a cylinder, and the sampler may be in a variety of geometrical shapes, for example, rectangular, hexagonal, or octagonal. One of skill in the art would readily recognize materials from which the sampling body and barrier door may be made. Suitable materials would be any that may withstand environmental conditions and do not degrade when wet, for example, plastic.

An exemplary definition of a sorbent or a sorbent material is the same as commonly used in the art. For example, a sorbent may be a material that can adsorb or absorb target contaminants to or within the surface of the sorbent material. The sorbent material may be a variety of materials, and in some embodiments, may be obtained commercially. Some of the sorbent and other materials that can be in the containers include carbon-based sorbents, silica-based sorbents (e.g., silica gel), polymeric sorbents and resins, resins based on diatomaceous earth, or any other material known to absorb or adsorb air contaminants. Examples of suitable carbon-based sorbents include, but are not limited to, activated carbon, activated charcoal, graphitized carbons (e.g., Carbopack™ X), carbon molecular sieves, synthetic carbon (e.g., ANASORB® 747, including silica-treated ANASORB® 747), other treated or modified charcoals or carbons, and combinations thereof. One example of a resin based on diatomaceous earth is CHROMOSORB® resins. Examples of suitable polymeric sorbents and resins include, but are not limited to, copolymers of styrene-divinylbenzene (e.g., XAD®️ resins such as XAD®-2), CHROMOSORB® resins, polymers based on 2,6-diphenyl-p-phenyleneoxide (e.g., TENAX® resins), and combinations thereof.

CHROMOSORB is a registered trademark currently owned by Imerys Minerals California, Inc. Corporation Delaware 1732 North First Street, Suite 450 San Jose California 95112. It can be purchased from Advanced Minerals Corporation. XAD is a registered trademark currently owned by Rohm And Hass Company, a Delaware corporation, 1732 North First Street, Suite 450 San Jose California, 95112. TENAX TA is a registered trademark currently owned by Buchem B.V. Corporation Netherlands at Minden 60 7327 Aw Apeldoorn Netherlands. ANASORB is a registered trademark of SKC, Inc. Corporation Pennsylvania at 863 Valley View Road, Eighty Four, Pennsylvania 15330 and can be purchased directly from SKC. Carbopack X is a product of Sigma Aldrich.

The overall size, shape, and amount of the sorbent should be such that it fits inside the sampling body without hindering attachment of the barrier door to the sampling body. In some embodiments, the sorbent medium may optionally be contained within a pouch. This may be particularly useful when the sorbent material is loose, granular, or comprised of particulates. One of skill in the art would readily recognize compatible containers or pouches, for example they may be mesh and/or made of stainless steel, nylon, Teflon, or any other compatible material. One of skill in the art will be familiar with the different kinds and forms in which sorbents are available as well as the appropriate sorbent to use for sampling a particular contaminant.

Figure 4:
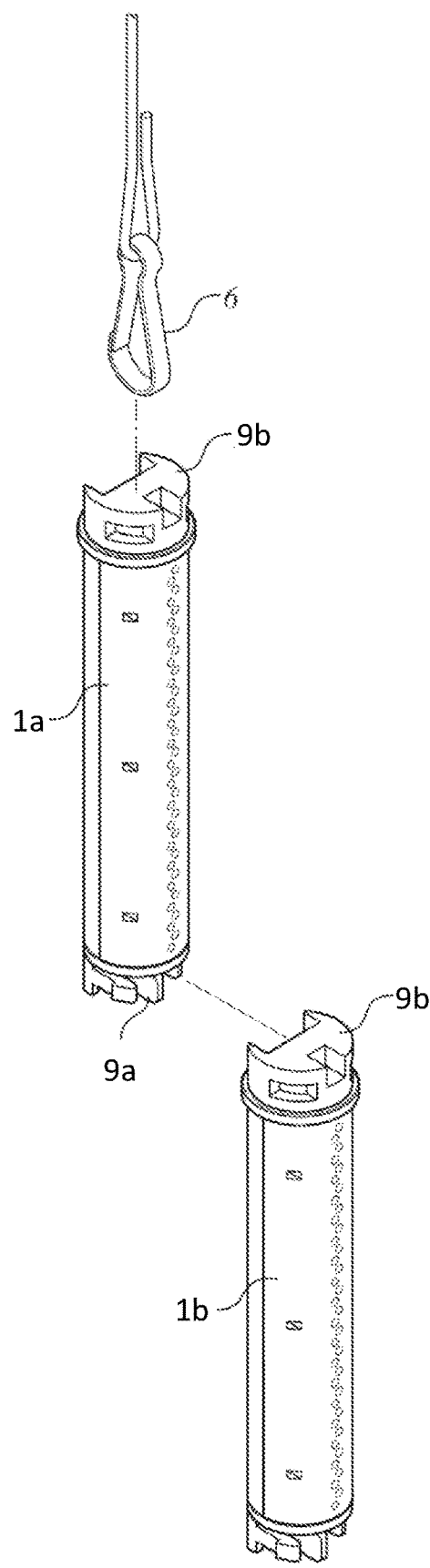
FIG. 4 shows that sampling bodies may be joined together, in one embodiment, end-to-end by a male-type interlocking mechanism on the bottom of one sampling body and a female-type interlocking mechanism on the top of another sampling body.

FIG. 4 is an exemplary illustration depicting the use of connecting mechanisms 9a and 9b to attach variable sampling device 1a to variable sampling device 1b to easily be attached to one another. While the connecting mechanism in FIG. 4 is shown as a male-type mechanism 9a that interlocks with a female-type mechanism 9b, any interlocking connecting mechanism is contemplated as within the scope of this invention. The individual connecting mechanisms 9a and 9b of FIG. 4 are attached to the top and bottom of each sampling body. However, placement at a different location on the sampling body is also contemplated as within the scope of the invention. By varying the placement of the connecting mechanism components on each sampling body, the orientation of attachment of separate variable sampling devices may be varied. For example, the variable sampling devices as shown in FIG. 4 are cylindrical having a long central axis and they are attached about this axis, end to end. This orientation may be particularly useful in applications where one or more variable sampling devices are fed down a hole for collecting gaseous or particulate samples. In other embodiments, the variable sampling devices may be placed side by side.

Figure 5:
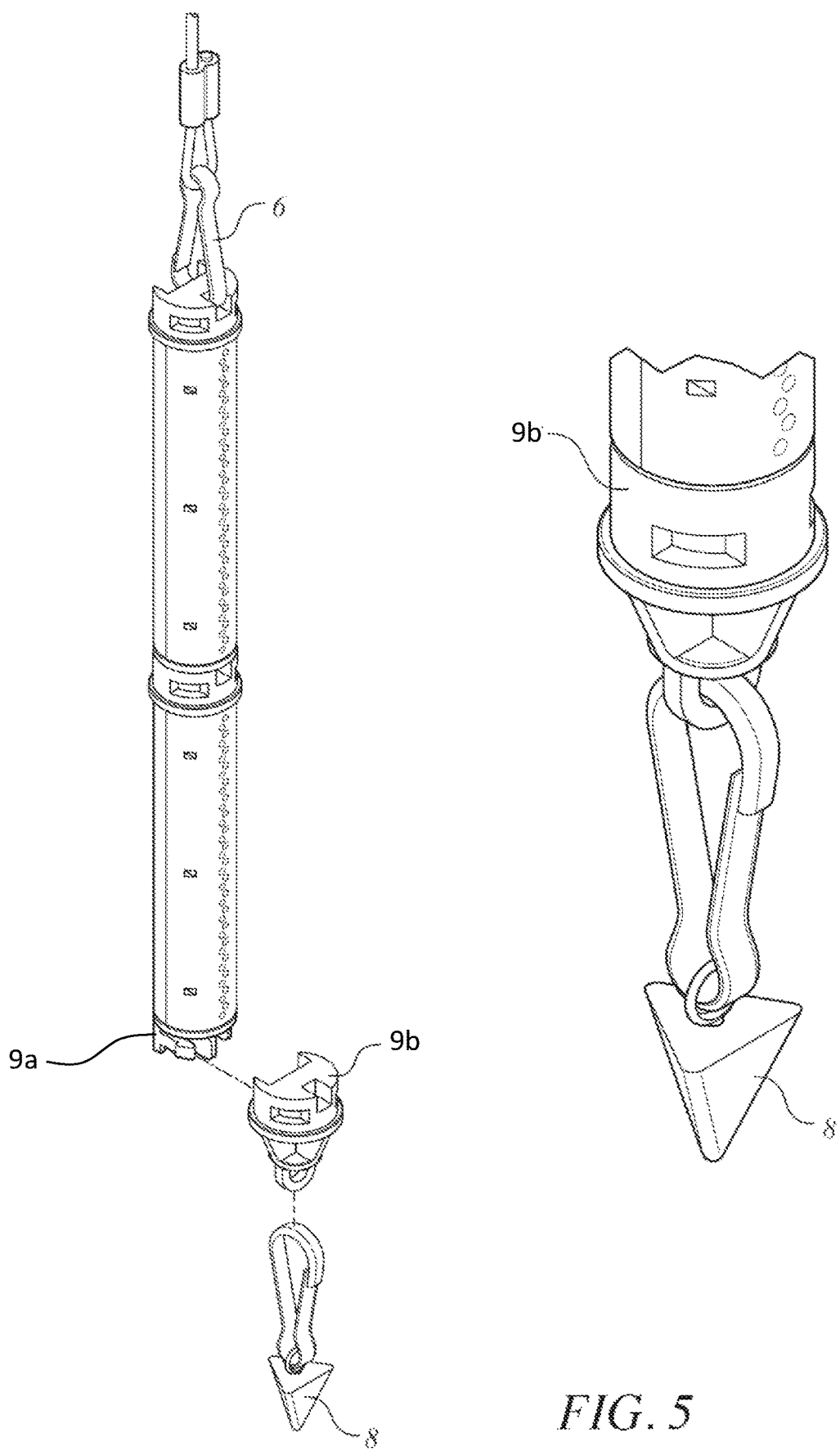
FIG. 5 illustrates that other components may be attached to each sampling body, for example, a clip to hang the variable sampling device or suspend something, such as a weight, from the bottom of the variable sampling device.

Optionally, other components may be attached to a sampling body by the same connection mechanisms utilized to connect sampling bodies. For example, FIG. 4 shows that a clip 6 may be attached to the female-type mechanism 9b on the top of one of the sampling bodies to allow the sampling body to hang or be attached to a structure. In another example, FIG. 5 shows that the male-type mechanism 9a on the bottom of one of the sampling bodies may be interlocked with a piece having a female-type mechanism 9b attached to another object, for example, a weight 8.

When considering two or more variable sampling devices, a different sorbent may be placed in each. Further, barrier doors with different permeabilities may be used with each. Thus, by attaching two or more variable sampling devices together, each with a unique sorbent and permeability, it is possible to collect a variety of environmental samples from the same soil sample and the same sampling period.

As described herein, the variable sampling device may be useful in sampling in a narrow space, for example, a hole in the ground or down a pipe. The area may be sampled, for example, by inserting one or more of these sampling bodies, connected end-to-end, down the hole.

Figure 6:
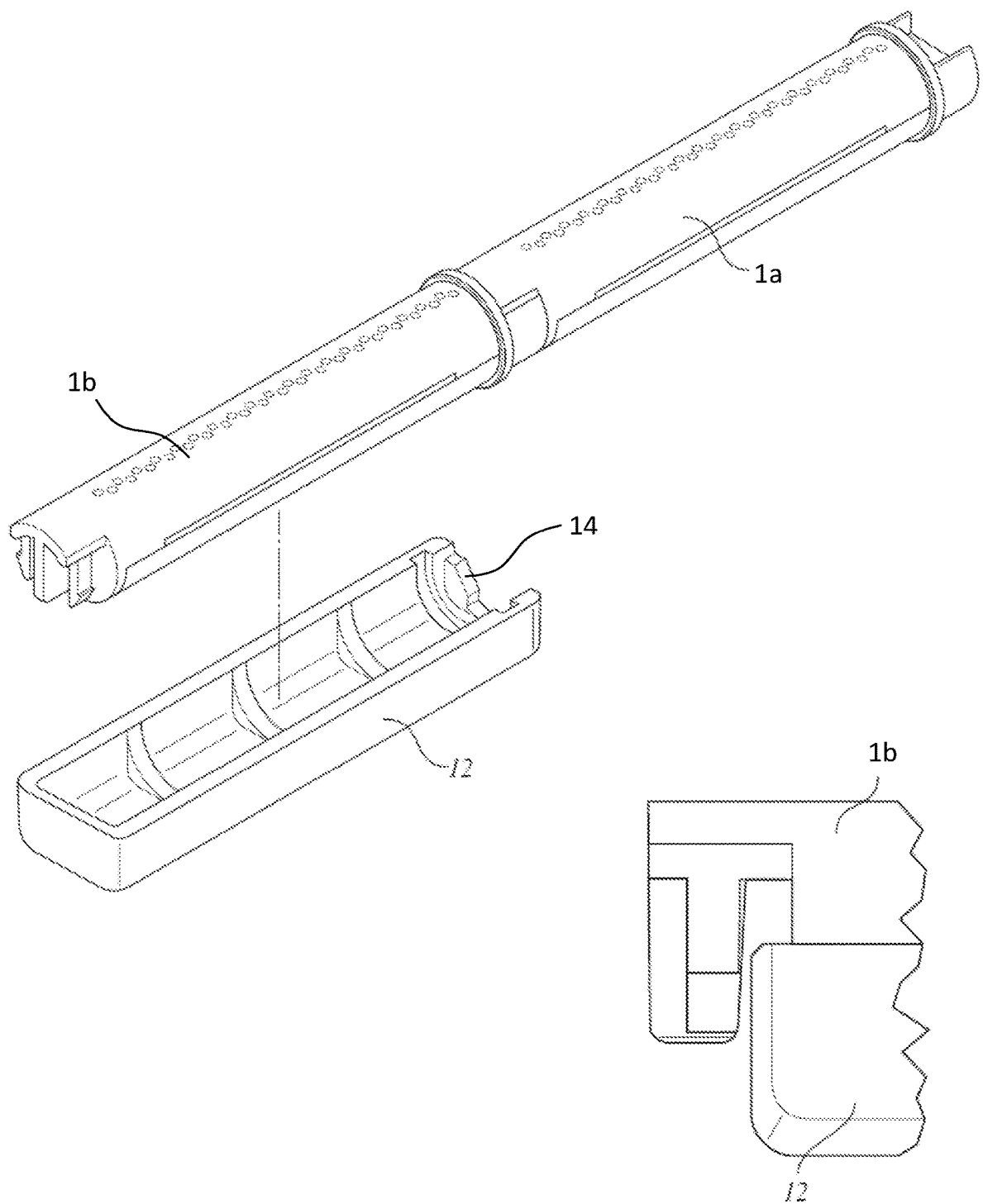
FIG. 6 illustrates a tool that may be used to disconnect adjacent sampling bodies from each other.
Figure 7:
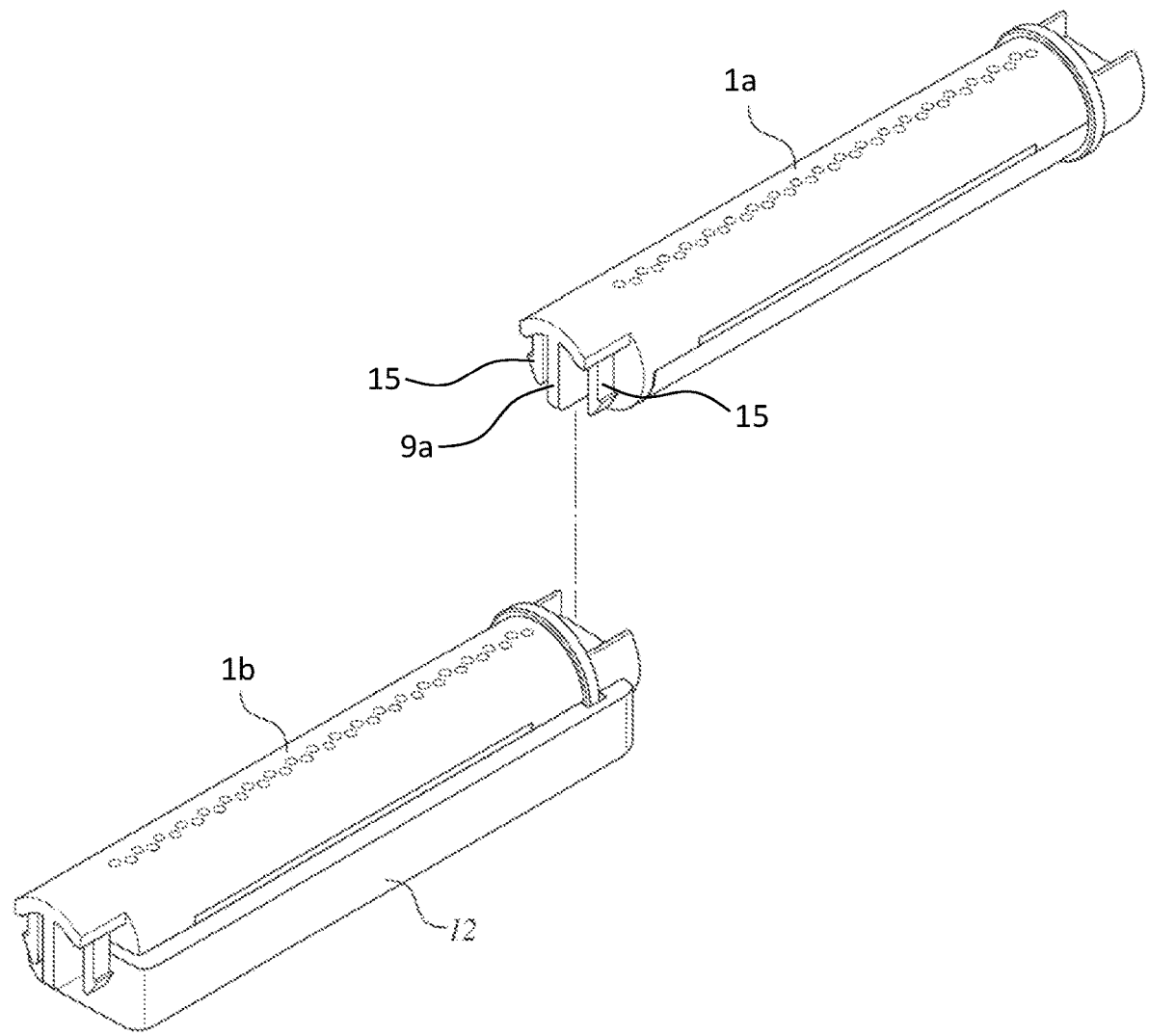
FIG. 7 illustrates use of the tool on a sampling body to disconnect an adjacent sampling body.

In another aspect, the present invention also encompasses a tool 12 to disconnect sampling bodies of each variable sampling device from each other. This process is exemplified in FIGS. 6 and 7. The tool 12 may be attached to one sampling body 1b which in turn, facilitates detachment of an adjoining sampling body 1a. This may be accomplished by lining up one of the variable sampling devices with the tool 12 as shown in FIG. 6, then pressing the variable sampling device into the tool. When this manipulation is performed, the tool's angled surfaces 14 will depress catches 15 on the adjoining mechanism 9a of the adjoining variable sampling device 1a and allow the variable sampling devices to be separated. This is shown in FIG. 7. While FIGS. 6 and 7 illustrate this tool for use on sampling bodies that are interlocked end-to-end, a similar tool can be employed for sampling bodies in different orientations.

Figure 8:
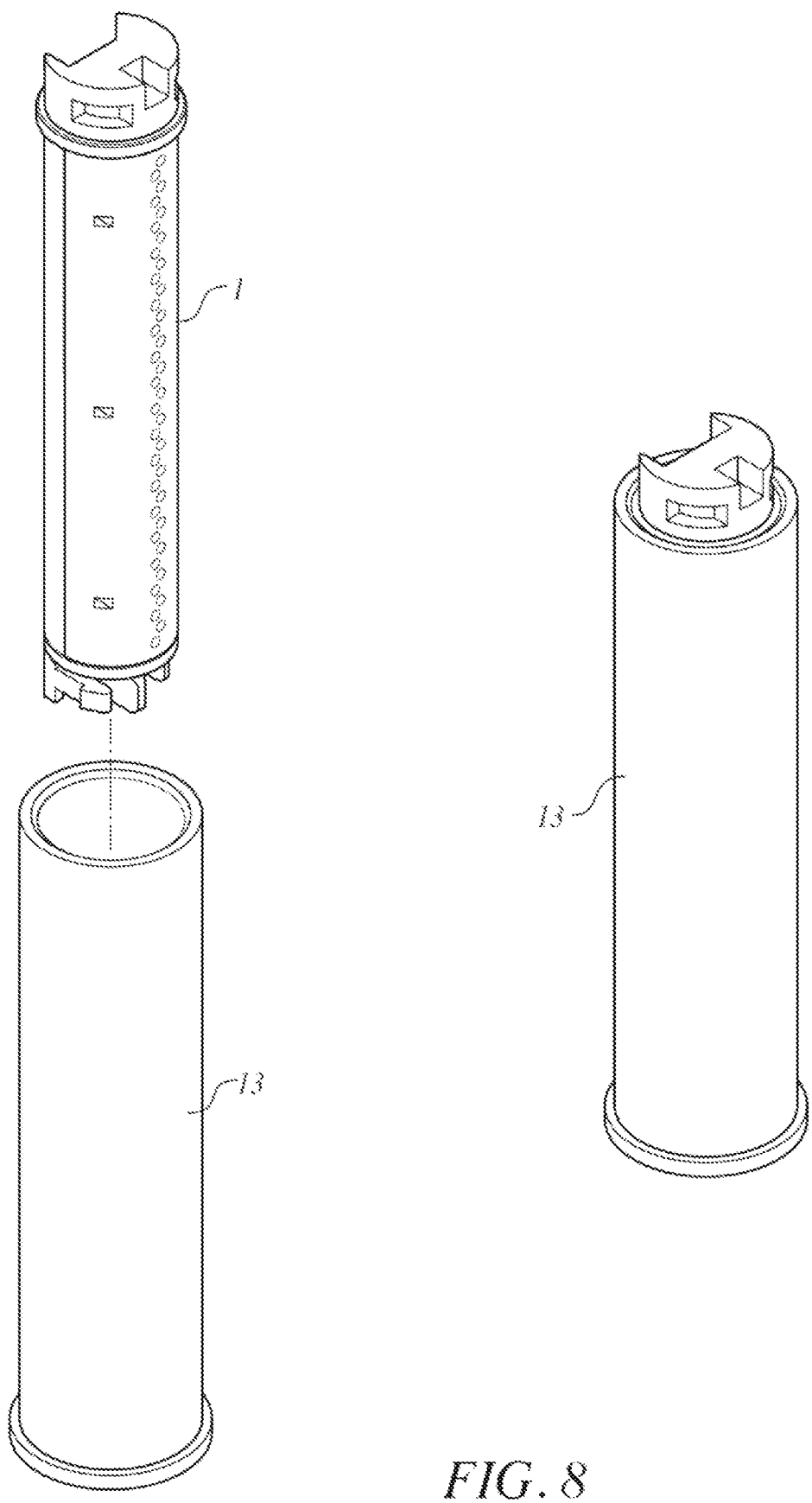
FIG. 8 illustrates the use of a sleeve to seal a sampling body for transportation prior to analysis of the sorbent inside.

It is contemplated as within the scope of the invention that removal of the sorbent may be done at the site of sampling or may be done at the site of analysis. For embodiments where sorbent will be removed at the analysis site, the present invention also encompasses a sleeve 13 to seal sampling bodies for transportation prior to analysis of the sorbent inside. FIG. 8 illustrates one embodiment of the sleeve 13 that may be used for cylindrical sampling bodies. The sleeve 13 fits over the sampling bodies such that it seals the sampling bodies from the outside environment and does not allow any air or other material to pass through any holes in the sampling bodies. In some embodiments the sleeve may incorporate gaskets or seals in order to create an airtight seal around the variable sampling device. After transport to the analysis site, the sleeve may be removed without damaging the variable sampling device. Thus the sampling device is reusable.

Figure 9:
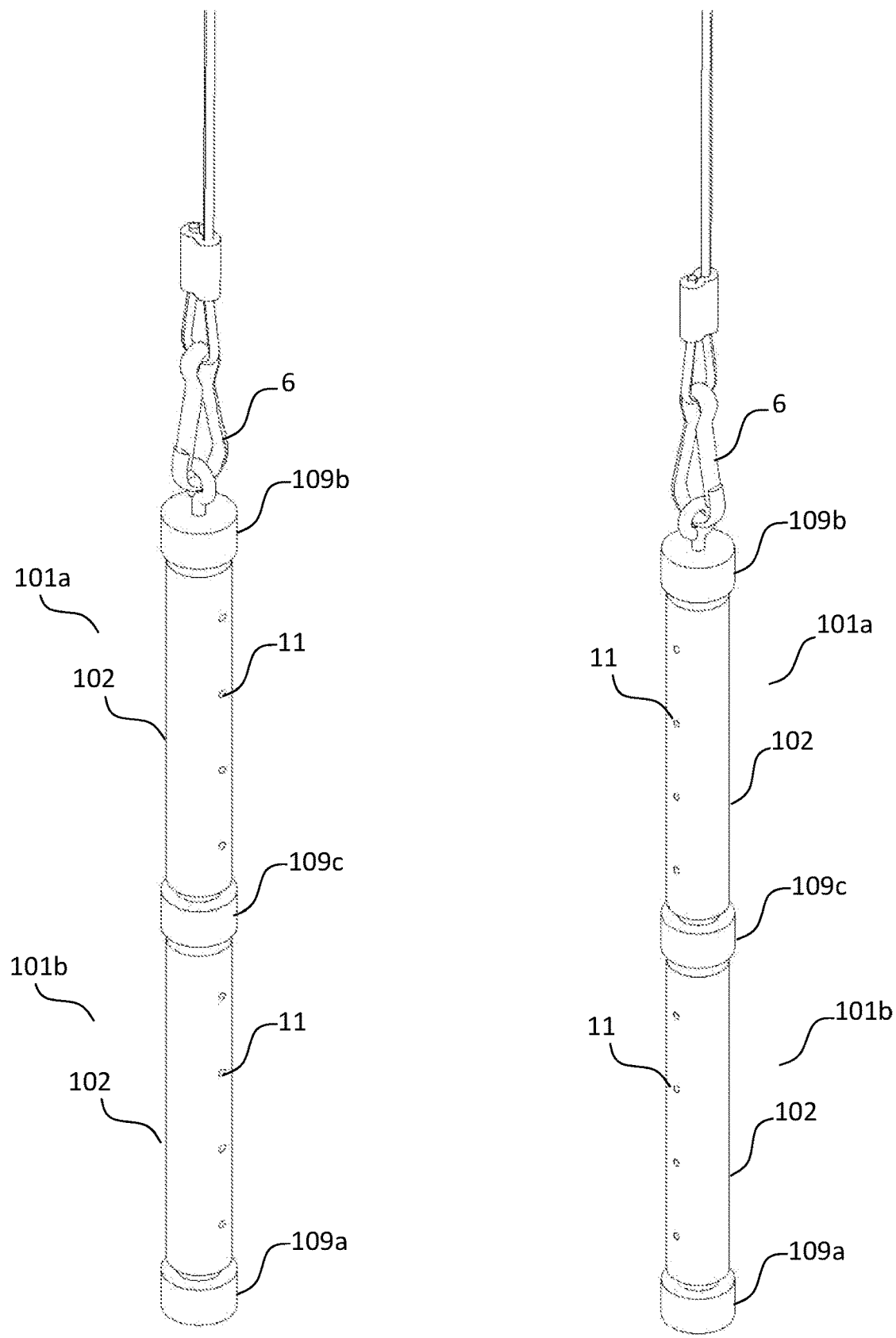
FIG. 9 shows a front and a back view of one embodiment of the variable sampling device.
Figure 11:
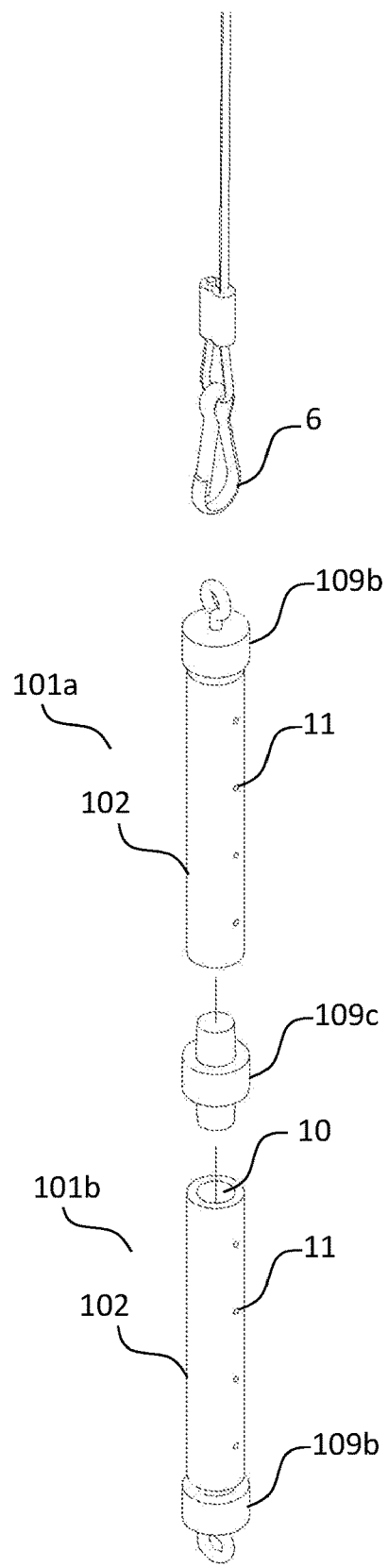
FIGS. 11-12 show that sampling bodies may be joined together, in one embodiment, end-to-end by a coupler.

FIG. 9 depicts a further embodiment of a variable soil sampling device as contemplated by the present invention. As depicted, FIG. 9 shows two variable soil sampling devices 101a, 101b connected to one another by a connecting mechanism illustrated by a coupler 109c. The top variable soil sampling device 101a has a top cap 109b that can be used to attach to a clip 6 to allow the sampling body to hang or be attached to a structure. The bottom variable soil sampling device 101b has an end cap 109a. It is contemplated herein that the bottom variable soil sampling device 101b may comprise the top cap 109b or the coupler 109c in place of the end cap 109a to optionally connect to a third variable soil sampling device (FIG. 11). Notably, each variable soil sampling device comprises a sampling body 102 having one or more holes 11 on an outer perimeter of the sampling body 102 through which air or other gasses may flow.

In some embodiments, the sampling body 102 comprises a barrier side on the outer perimeter having one or more holes 11. In some embodiments, the sampling body 102 comprises a front side and a back side on the outer perimeter where each of the front and back sides have one or more holes 11.

As illustrated in FIG. 9, the coupler 109c is used to connect variable soil sampling devices 101a, 101b. In some embodiments, the coupler 109c is an interference fitting or a tapered interference fitting. As shown in FIG. 9, the variable soil sampling devices 101a, 101b are cylindrical having a long central axis that are attached, end to end about this axis by the coupler 109c. This orientation may be useful in applications where one or more variable soil sampling devices are fed down a hole for collecting gaseous or particulate samples.

Figure 10:
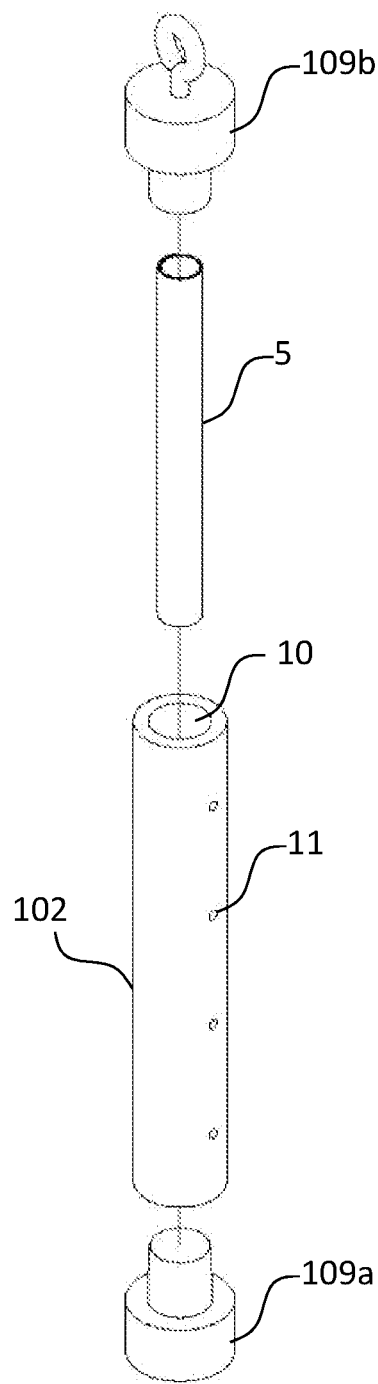
FIG. 10 shows one embodiment of a disassembled variable sampling device having a sampling body with holes on an outer perimeter of the sampling body, and an example of a sorbent material that may be placed within the sampling body.

FIG. 10 displays an embodiment of a variable soil sampling device. The variable sample device comprises a sampling body 102, a top end configured to receive top cap 109b, an outer perimeter with one or more holes 11, and an opening that defines a space 10 where a sorbent 5 is placed. It is contemplated herein that the sorbent 5 can be placed inside the sampling body 102 from the top end or the bottom end of the sampling body 102. As illustrated in FIG. 10, a bottom end of the sampling body 102 comprises an end cap 109a. In some embodiments, the bottom end of sampling body 102 may comprise the coupler 109c for connecting to a second variable soil sampling device.

While in use, the sorbent 5 is placed inside the sampling body 102 and holes 11 on the outer perimeter will permit air flow and collection of particulate or chemicals in the air by the sorbent 5 inside. As above, the number of holes, the pattern of holes, as well as the size of the holes may be altered to achieve a desired permeability or sampling rate. Typical permeability of the holes on the outer perimeter can be from 0.5 to 130 milliliters per minute. Other rates are also contemplated herein. After a specified period of time, the sorbent 5 can be removed for analysis, and the sampling body can be refilled with a fresh sorbent of additional use.

FIGS. 9-10 show each variable soil sampling device having a cylindrical shape, however the shape is not limited to a cylinder, and the sampler may be in a variety of geometrical shapes, for example, rectangular, hexagonal, or octagonal. One of skill in the art would readily recognize materials from which the sampling body and barrier door may be made. Suitable materials would be any that may withstand environmental conditions and do not degrade when wet, for example, plastic.

FIG. 11 illustrates a further embodiment of a variable soil sampling device as contemplated by the present invention. As depicted, FIG. 11 shows two variable soil sampling devices 101a, 101b connected to one another by a coupler 109c. The top variable soil sampling device 101a has a top cap 109b that can be used to attach to a clip 6. The bottom variable soil sampling device 101b has the top cap 109b that may be used to optionally connect to a third variable soil sampling device (not shown). In some embodiments, the bottom variable soil sampling device 101b has the coupler 109c in place of the top cap 109b that may be used to optionally connect to the third variable soil sampling device (not shown). Notably, each variable soil sampling device comprises a sampling body 102 having one or more holes 11 on an outer perimeter of the sampling body 102 through which air or other gasses may flow. The variable soil sampling devices 101a and 101b have a space 10 where the sorbent is placed.

When considering two or more variable sampling devices, a different sorbent may be placed in each. Further, sampling bodies each with different permeabilities may be used with each sampling device. Thus, by attaching two or more variable sampling devices together, each with a unique sorbent and/or permeability, it is possible to collect a variety of environmental samples from the same soil sample and the same sampling period.

Figure 12:
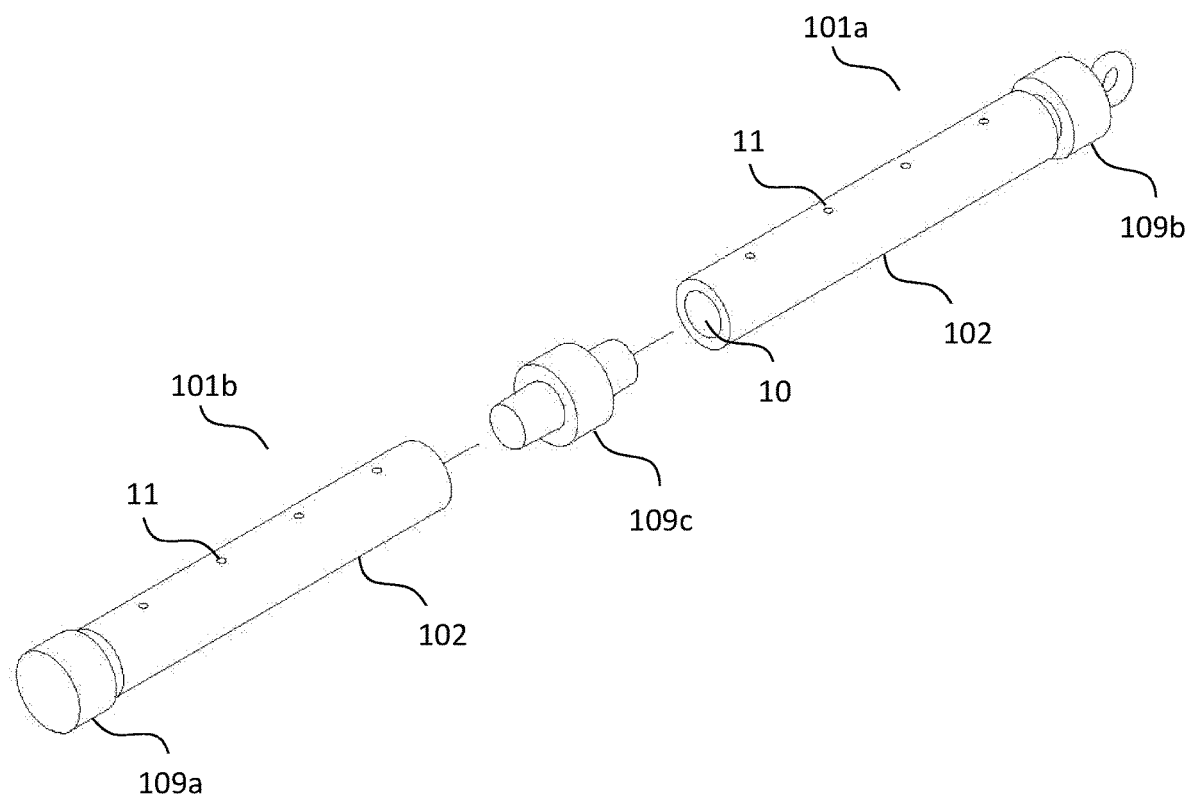

FIG. 12 illustrates a further embodiment of a variable soil sampling device as contemplated by the present invention. As depicted, FIG. 12 shows two variable soil sampling devices 101a, 101b connected to one another by a coupler 109c. The top variable soil sampling device 101a has a top cap 109b. The bottom variable soil sampling device 101b has an end cap 109a. Notably, each variable soil sampling device comprises a sampling body 102 having one or more holes 11 on an outer perimeter of the sampling body 102 through which air or other gasses may flow. The variable soil sampling devices 101a, 101b have a space 10 where the sorbent is placed.

The present invention also provides a method for sampling using a variable soil sampling device as described herein. One or more variable sampling devices may be attached to each other by interlocking connecting mechanisms and sorbent material may be placed in each of the variable sampling devices as described above. Optionally, the sorbent material may be placed in each variable sampling device prior to attaching variable sampling devices together. The one or more variable sampling devices may then be exposed to the desired sampling environment. A rope, chain, or string may be attached to a sampling body of a variable sampling by a hook or clasp as illustrated in FIG. 1, FIG. 4, FIG. 5, FIG. 9, and FIG. 11. This may aid in placing the one or more variable sampling devices down a hole or a pipe. Optionally, a weight may be attached, as illustrated in FIG. 5, to aid the process of device placement.

The present invention provides a highly versatile device and method for soil sampling in that a wide variety of sorbents may be employed while, at the same time, the uptake rate and arrangement of the sampling bodies can be changed and varied almost infinitely. Sampling bodies in a range of very high and very low permeability can be employed while the chambers can contain the same or different sorbent materials.

The systems, apparatus, and methods disclosed herein are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems, apparatus, and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Although various example embodiments have been disclosed, a worker of ordinary skill in this art would recognize that certain modifications would come within the scope of this disclosure. For that reason, the following claims should be studied to determine the scope and content of this disclosure.

The invention claimed is:
1. A variable soil sampling device comprising:
a) a first sampling body comprising a top end configured to receive a top cap, an outer perimeter with one or more holes, and an opening defining a space where a first sorbent is placed, said first sampling body having a first permeability;

b) a second sampling body comprising a bottom end configured to receive an end cap, an outer perimeter with one or more holes, and an opening defining a space where a second sorbent is placed, said second sampling body having a second permeability; and c) a first coupler that connects a bottom end of the first sampling body to a top end of the second sampling body, wherein the first permeability and the second permeability are different.

2. The variable soil sampling device as recited in claim 1, wherein the first coupler is an interference fitting or a tapered interference fitting.

3. The variable soil sampling device as recited in claim 1, wherein the end cap is an interference fitting.

4. The variable soil sampling device as recited in claim 1, wherein the second sorbent is different than the first sorbent.

5. The variable soil sampling device as recited in claim 1, further comprising:

a) a third sampling body comprising a bottom end configured to receive an end cap, an outer perimeter with one or more holes, and an opening defining a space where a third sorbent is placed, said second sampling body having a third permeability; and b) a second coupler that connects the bottom end of the second sampling body to a top end of the third sampling body.

6. The variable soil sampling device as recited in claim 5, wherein the third sorbent is different than either of the first sorbent or second sorbent.

7. The variable soil sampling device as recited in claim 5, wherein the first permeability, the second permeability, and the third permeability are different.

8. The variable soil sampling device as recited in claim 1, wherein the first and second sampling bodies are cylindrical.

9. The variable soil sampling device as recited in claim 1, wherein the first or second sorbent is a sorbent material.

10. The variable soil sampling device as recited in claim 9, wherein the sorbent material is selected from the group consisting of carbon based resins and sorbents, silica-based sorbents, hydrophobic copolymer of styrene-divinylbenzene, resins based on diatomaceous earth, resins based on 2,6-diphenylene oxide, and combinations thereof.

11. The variable soil sampling device as recited in claim 10, wherein the carbon based resins and sorbents are selected from the group consisting of activated carbon, activated charcoal, graphitized carbons, carbon molecular sieves, synthetic carbon, silica treated synthetic carbon, and combinations thereof.

12. The variable soil sampling device as recited in claim 1, wherein the first sampling body and the second sampling body each have a long axis and are connected to each other end to end about said long axis.

13. The variable soil sampling device as recited in claim 1, wherein the first or second sampling body does not have a barrier door.

14. The variable soil sampling device as recited in claim 1, wherein each of the first and second sampling bodies comprise a front side and a back side having the one or more holes on the outer perimeter.

15. A variable soil sampling device comprising:

a) a first sampling body having an opening and a space where a first sorbent is placed;

b) a first barrier side in the first sampling body comprising one or more holes, the first barrier side having a first permeability;

c) a second sampling body having an opening and a space where a second sorbent is placed;

d) a second barrier side in the second sampling body having a second set of one or more holes, the second barrier side having a second permeability; and e) a first connector on the second sampling body that connects the second sampling body to the first sampling body, wherein the first permeability and the second permeability are different.

16. The variable soil sampling device as recited in claim 15, wherein the first connector is a coupler, an interference fitting, or a tapered interference fitting.

17. The variable soil sampling device as recited in claim 15, wherein the second sorbent is different than the first sorbent.

18. A variable soil sampling device comprising:

a) a first sampling body comprising a front side and a back side on an outer perimeter, each of the front and back sides having one or more holes, and an opening defining a space where a first sorbent is placed, said first sampling body having a first permeability;

b) a second sampling body comprising a front side and a back side on an outer perimeter, each of the front and back sides having one or more holes, and an opening defining a space where a second sorbent is placed, said second sampling body having a second permeability; and c) a first connector on the second sampling body that connects the second sampling body to the first sampling body, the first connector comprising a first protrusion inserted into the opening of the first sampling body at one end thereof and a second protrusion inserted into the opening of the second sampling body at one end thereof.

19. The variable soil sampling device as recited in claim 18, wherein the first connector is an interference fitting or a tapered interference fitting.

20. The variable soil sampling device as recited in claim 18, wherein the first permeability and the second permeability are different, or wherein the second sorbent is different than the first sorbent.

\* \* \* \* \*